Patented Sept. 5, 1944

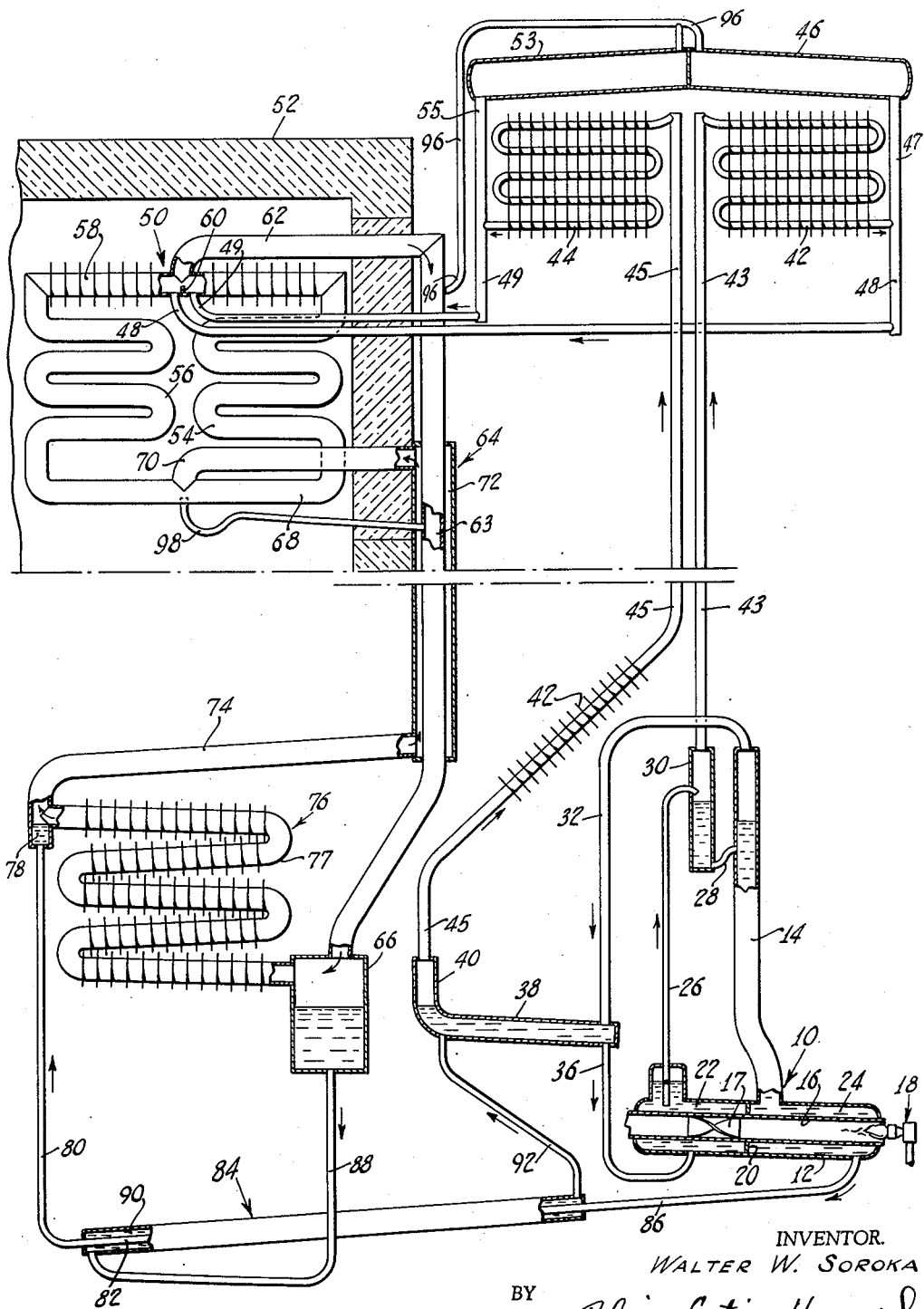

2,357,612

UNITED STATES PATENT OFFICE 2,357,612

REFRIGERATION

Walter W. Soroka, Evansville, Ind., assignor to Servel, Inc., New York, N. Y., a corporation of Delaware Application October 4, 1941, Serial No. 413,577

18 Claims. (Cl. 62—119.5)

This invention relates to refrigeration and more particularly to an absorption type refrigeration system wherein the refrigerant is evaporated in the presence of an inert gas.

An object of this invention is to provide a refrigeration system which is efficient and dependable in operation and which is adaptable for a variety of uses. A further object is to provide a refrigerator wherein controlled quantities of refrigerant are delivered to a plurality of evaporators. A further object is to provide, in combination with a refrigerator generator, a means for automatically dividing a stream of the refrigerant. These and other objects will be in part obvious and in part pointed out below.

The drawing comprises a single figure showing more or less diagrammatically a refrigeration system embodying the invention. This is a closed system containing a refrigerant fluid, such as ammonia, a liquid absorbent for the refrigerant, such as water, and an auxiliary pressure equalizing fluid, such as hydrogen. During operation ammonia is driven from the aqua-ammonia solution in the generator and the ammonia is then condensed. The condensed refrigerant is delivered to an evaporator where it evaporates in the presence of the hydrogen. The mixture of hydrogen and ammonia gases flows to an absorber where the ammonia is absorbed by the "weak liquor," which is a weak solution of ammonia and water received from the generator, and the hydrogen deprived of ammonia returns to the evaporator. The liquor enriched with the ammonia returns to the generator, thus completing the cycle.

In the illustrative embodiment the refrigeration system is provided with a generator 10 which is supplied with the strong aqua-ammonia solution, referred to as "rich liquor." At the left of the generator is an absorber 76 formed of a finned coil pipe 77 and an absorber sump vessel 66. Above the absorber is shown an evaporator assembly 50 having a right-hand section 54 and a left-hand section 56 positioned within a heat-insulated refrigerated compartment 52. At the right of the evaporator assembly are two finned condensers 42 and 44, each of which is provided with a gas pressure vessel, there being a pressure vessel 46 connected through a conduit 47 to condenser 42 and a pressure vessel 53 connected through a conduit 55 to condenser 44.

Generator 10 comprises a horizontal main portion 12 and a standpipe 14. Extending through the main portion 12 is a flue 16, at the right-hand end of which is positioned a gas burner 18 directing its flame into the end of the flue. Under some circumstances it may be desirable to use other heating means such as an electric heating element or a liquid fuel burner. Within the generator portion 12 to the left of the bottom of standpipe 14 is a fluid-tight partition 20 which forms a left-hand chamber 22 and a right-hand chamber 24. Connected to and extending upwardly from chamber 22 is a vapor lift conduit 26, the upper end of which empties into a separating vessel 30. The upper end of vessel 30 is connected through a conduit 43 to condenser 42. The lower end of vessel 30 is connected through an upwardly extending conduit 28 to the upper end of standpipe 14, with conduit 28 opening below the liquid level in the standpipe. Rich liquor is supplied to the generator through a conduit 36, which opens into the bottom of chamber 22 and which receives the liquor from the analyzer or heat exchanger 38. The top of standpipe 14 is connected through a conduit 32 to the right-hand end of analyzer 38, and at the left the analyzer is provided with a gas collector 40 toward which the vapor bubbles when it enters the analyzer from conduit 32. Gas collector 40 is connected through a conduit 45 to condenser 44. Directly over the analyzer a portion of conduit 45 is provided with fins 42 which dissipate sufficient heat to cause the conduit to act as a rectifier.

The vapors passing to condensers 42 and 44 are condensed, with the condensed refrigerant from condenser 42 flowing through a conduit 48 to the left-hand evaporator section 56, and with the condensed refrigerant from condenser 44 flowing through a similar conduit 49 to the right-hand evaporator section 54. The tops of sections 56 and 54 are formed by a horizontally extending finned pipe 58, and at the center of the pipe between the outlets from conduits 48 and 49 is a semicircular dam 60. Dam 60 causes the liquid from conduit 48 to flow to the left and the liquid from conduit 49 to flow to the right. Connected to pipe 58 directly above dam 60 is a gas return conduit 62, which extends through the compartment wall and thence downwardly, forming the inner passage 63 of a heat exchanger 64, and thence to the absorber sump vessel 66. The bottom ends of evaporator sections 54 and 56 are connected to form an unobstructed horizontal pipe 68 the center of which is connected to a gas supply conduit 70. Conduit 70 extends to the outer passage 72 of heat exchanger 64 and conduit 74 to the upper end of absorber 76.

At the top of the absorber is a liquid supply sump 78 into which empties a liquid supply conduit 80 supplying weak liquor to the absorber. Conduit 80 extends downwardly and to the right through the inner passage 82 of heat exchanger 84, and conduit 86 to chamber 24 of generator 10. The bottom of absorber sump vessel 66 is connected through a conduit 88 and the outer passage 90 of heat exchanger 84 to a conduit 92 which is connected to the left-hand end of the analyzer. The rich liquor flows from sump vessel 66 into analyzer 38 in heat exchange relationship with the hot weak liquor flowing from the generator to the absorber. As indicated above, the rich liquor flows from the right-hand end of the analyzer through conduit 36 into chamber 22 of the generator. In flowing through the analyzer, the rich liquor flows in counterflow relationship with the refrigerant vapor delivered to the analyzer through conduit 32, with the result that the rich liquor is further heated and the vapor is cooled. Gas pressure vessels 46 and 53 are mounted together as a unit above their respective evaporators, and at their adjacent ends the pressure vessels are connected to the forked end of a conduit 96 and thus to the gas return conduit 62. In this manner each condenser is provided with its own pressure vessel, and the pressure vessels are connected to the gas circuit. It is well known that a pressure vessel operates as an auxiliary condenser when refrigerant vapor is supplied thereto upon an increase in pressure in the system. In accordance with the present arrangement the separate pressure vessels 46 and 53 for the condensers 42 and 44, respectively, maintain the proper division of the refrigerant in the two separate streams from the generator 10 to cause all of the refrigerant in one stream to be delivered to the evaporator section 54 and all of the refrigerant in the other stream to be delivered to the evaporator section 56. The bottom of the evaporator assembly 50 is connected through a liquid trap pipe 98 to the central passage of heat exchanger 64 to thereby return unevaporated liquid to the absorber.

Positioned within flue 16 is a flue baffle 17 which increases the heating effect of the flue gases in heating the liquor in chamber 22. In operation the relative amount of refrigerating effect in the two sections of the evaporator is determined by the division of refrigerant between the sections. This in turn depends upon the relative quantities of refrigerant gas delivered to the two conduits 43 and 45. The amount of refrigerant vapor delivered to conduit 43 depends primarily upon the heating of the liquor in chamber 22, and similarly, the amount of refrigerant vapor delivered to conduit 45 depends primarily upon the heating within chamber 24. By initially adjusting the position of partition 20, and by then adjusting the position of flue baffle 17, the relative cooling in the two evaporator sections may be readily controlled. Thus, for any given amount of heating by burner 18, there will be a specific refrigerating effect at each of the evaporator sections.

It is thus seen that I have provided an improved refrigeration system in accordance with the objects set forth. As many possible embodiments may be made of the mechanical features of the above invention, and as the art herein described might be varied in various parts, all without departing from the scope of the invention, it is to be understood that all matter hereinabove set forth, or shown in the accompanying drawing, is to be interpreted as illustrative and not in a limiting sense.

I claim:

1. In a refrigeration system containing a refrigerant and a fluid absorbent and having a place of heating for causing expulsion of refrigerant from the fluid absorbent, means including a heat exchanger through which a stream of the fluid absorbent rich in refrigerant flows to the place of heating, means to draw off a first stream of refrigerant vapor which is expelled during the early stages of heating the stream of fluid absorbent, means to draw off a second stream of refrigerant vapor during the final heating of the stream of fluid absorbent and to pass said second stream of refrigerant vapor through said heat exchanger in intimate contact with said stream of fluid absorbent, and means to condense said first and second streams of refrigerant vapor separately to thereby produce separate streams of liquid refrigerant.

2. In an absorption refrigeration system containing a refrigerant and a liquid absorbent, means to heat the absorbent rich in refrigerant and separate the refrigerant vapor from the liquid absorbent comprising, a generator unit including a first heating chamber and a second heating chamber and having extending from said second heating chamber a standpipe, a separating vessel positioned adjacent the top of said standpipe and having a liquid connection therewith, said liquid connection providing a liquid seal between said separating vessel and said standpipe, a vapor lift connected to and extending from said first heating chamber and connected to said separating chamber to deliver heated liquid absorbent and vapor to said separating chamber with the result that the vapor may be withdrawn from said separating chamber and the liquid absorbent flows into said standpipe and thence through said second heating chamber, and means to withdraw vapor from the top of said standpipe.

3. In a refrigeration system containing a refrigerant and a liquid absorbent and having a place of heating for causing expulsion of refrigerant from the liquid absorbent and a gas circuit in which evaporation of liquid refrigerant takes place in the presence of an inert gas, means to draw off a first stream of refrigerant vapor from the place of heating, means to draw off a second stream of refrigerant vapor from the place of heating, a first condenser unit to condense said first stream of refrigerant vapor, a second condenser unit to condense said second stream of refrigerant vapor, both of said condenser units being connected to said gas circuit to deliver liquid refrigerant thereto, a first gas pressure vessel connected to said first condenser and to the gas circuit, a second gas pressure vessel connected to said second condenser and to the gas circuit, the arrangement being such that refrigerant drawn off from the first and second places of heating is maintained in separate streams from the generator to the gas circuit.

4. In the art of expelling the refrigerant from a liquid absorbent, the steps of passing the liquid absorbent rich in refrigerant into a first heating chamber and heating the liquid therein to thereby expel a first stream of substantially pure refrigerant vapor, passing the stream of liquid absorbent thus heated into the top of a standpipe which is open at its bottom to a second heating chamber, withdrawing a second stream of refrigerant vapor from the top of said standpipe, withdrawing a stream of liquid absorbent weak in refrigerant from the bottom of said second heating chamber, removing from said second stream of refrigerant vapor any vapor absorbent which may be present, and condensing said first and second streams of refrigerant vapor separately to thereby produce a first and second stream of liquid refrigerant.

5. A method of absorption refrigeration including the steps of passing a stream of liquid absorbent rich in refrigerant to a place of heating through an analyzer, first heating the stream of liquid absorbent to expel therefrom a first stream of refrigerant vapor, thereafter heating the stream of liquid absorbent to expel therefrom a second stream of refrigerant vapor, passing said first stream of refrigerant vapor directly to a condenser assembly, and passing said second stream of refrigerant vapor through said analyzer in contact with said stream of liquid absorbent and thence to said condenser assembly.

6. In a refrigeration system containing a refrigerant and a fluid absorbent and having a place of heating for causing expulsion of refrigerant from the fluid absorbent, means including a heat exchanger through which a stream of fluid absorbent containing a refrigerant flows to the place of heating, means to draw off separately two streams of refrigerant vapor expelled during the heating of the fluid absorbent, a first condenser means, means to pass one of said streams of refrigerant vapor to said first condenser means in a path of flow out of heat exchange relation with fluid absorbent flowing through said heat exchanger, a second condenser means, means to pass the other of said streams of refrigerant vapor to said second condenser means through said heat exchanger in heat-exchange relationship with said stream of fluid absorbent, and an evaporator assembly to receive the refrigerant liquid condensed in said first and second condenser means.

7. In an absorption refrigeration system, a generator having two sections to which liquid absorbent containing refrigerant is passed for heating, means to withdraw two separate streams of refrigerant vapor from the respective sections of said generator and to condense the two streams of refrigerant vapor to thereby provide two separate streams of liquid refrigerant, a single heating element for distribution of the heat from the said generator, and means to control the single heating element to the separate sections of the generator thereby to regulate the relative amounts of refrigerant supplied to each stream of liquid refrigerant.

8. In a refrigeration system, the combination of an evaporator having two parts arranged in parallel side by side relationship and operative independently to produce cooling effects, a two-part condenser assembly adapted to condense refrigerant and supply two separate streams of the liquid refrigerant respectively to the upper portions of the two parts of said evaporator for parallel flow therethrough by gravity. means to supply separate streams of refrigerant vapor to be condensed by said condenser with each of the two parts of the condenser condensing the refrigerant which it receives and passing the condensed refrigerant to the respective part of said evaporator, and means to control the relative amounts of refrigerant vapor being delivered to the two parts of said condenser whereby the relative cooling effect of the two parts of the evaporator is controlled.

9. In an absorption refrigeration system containing a refrigerant and an absorbent, an evaporator assembly including a plurality of individual parts, each of said parts comprising high and low temperature portions arranged in series and the parts being arranged in parallel side by side relationship, a condenser assembly having individual parts corresponding respectively to the individual parts of said evaporator assembly with each part of the condenser assembly connected to deliver an individual stream of refrigerant liquid to the respective part of said evaporator assembly, a generator assembly to supply separate streams of refrigerant vapor to the respective parts of said condenser assembly including means to heat the absorbent to drive the refrigerant vapor therefrom, and control means to control the relative heating effects thereby to regulate the relative amounts of refrigerant vapor supplied to said individual parts of said condenser assembly.

10. In a refrigeration system in which refrigerant is evaporated in the presence of an inert gas, an evaporator assembly including a plurality of individual parts, each of said parts comprising high and low temperature portions arranged in series and the parts being arranged in parallel side by side relationship, means to supply inert gas for parallel flow through said individual parts, a corresponding plurality of condenser parts to supply refrigerant liquid to said evaporator parts respectively, means to supply refrigerant vapor to said condenser parts, and means to control the relative amounts of the refrigerant condensed in said condenser parts and thus the relative amounts of liquid supplied to said individual parts of the evaporator assembly whereby the relative cooling effects of the individual parts of the evaporator assembly are regulated.

11. A method of refrigeration which includes flowing absorption solution from a place of absorption to a first place of heating in which refrigerant vapor is expelled from solution, flowing the solution from the first place of heating to a second place of heating in which refrigerant vapor is also expelled from solution, flowing the refrigerant vapor from the first place of heating to one place in which the vapor is converted to liquid, such refrigerant vapor from said first place of heating flowing in a path of flow out of physical contact with absorption liquid flowing from the place of absorption to said places of heating, flowing refrigerant vapor from the second place of heating through a region in intimate contact with absorption solution flowing from the place of absorption to said places of heating and thence from said region to another place in which such refrigerant vapor is converted to liquid, flowing liquid from said one liquid conversion place to one region in which such liquid evaporates to produce a refrigerating effect, and flowing liquid from said other liquid conversion place to another region in which such liquid evaporates to produce a refrigerating effect.

12. A refrigerating system comprising an absorber and a generator unit providing several chambers constituting heat receiving parts, said absorber and said generator unit being interconnected to provide a circuit for circulation of absorption solution, first and second condensers, conduit means for conducting vapor from one of said heat receiving parts to said first condenser, conduit means for conducting refrigerant vapor from another of said heat receiving parts to said second condenser, evaporator structure, conduit means for conducting liquid formed in said first condenser to one part of said evaporator structure, conduit means for conducting liquid formed in said second condenser to another part of said evaporator structure, a single heating element for said heat receiving parts, and a movable device for regulating the distribution of heat supplied to said separate heat receiving parts from said single heating element.

13. A refrigerating system comprising an absorber and a generator assembly providing a plurality of chambers, said absorber and said generator assembly being interconnected to provide a circuit for circulation of absorption solution in which absorption solution flowing from said absorber to said generator assembly flows first to one of said chambers and thence to another of said chambers, first and second condensers, conduit means for conducting refrigerant vapor from said one chamber to said first condenser, said conduit means being out of heat exchange relation with the portion of said circuit through which absorption solution flows from said absorber to said generator assembly, conduit means having a portion associated with a part of said circuit for conducting refrigerant vapor from said other chamber in intimate contact with absorption solution flowing from said absorber to said generator assembly and thence from said portion to said second condenser, an evaporator structure, conduit means for conducting liquid formed in said first condenser to one part of said evaporator structure, and conduit means for conducting liquid formed in said second condenser to another part of said evaporator structure.

14. In the art of providing two separate evaporator sections with separate streams of liquid refrigerant, the steps of passing a stream of liquid absorbent containing refrigerant through an analyzer chamber to a place of heating, heating the stream of liquid absorbent in a first chamber at said place of heating from which extends a vapor lift for lifting liquid absorbent by vapor lift action from said first chamber to a separating vessel, flowing the refrigerant vapor from said separating vessel in the form of a first stream to a condenser where it is liquefied to produce a first stream of liquid refrigerant, flowing the stream of liquid absorbent from said separating vessel into a standpipe which is open at its bottom to a second heating chamber at said place of heating, heating the liquid in said second heating chamber so that a second stream of refrigerant vapor is expelled into the top of said standpipe, flowing said second stream of refrigerant vapor through said analyzer chamber, flowing said second stream of refrigerant vapor from said analyzer chamber to a condenser assembly where it is liquefied to produce a second stream of liquid refrigerant, and flowing said first and second streams of liquid refrigerant to the two separate evaporator sections.

15. In an absorption refrigeration system containing a refrigerant and a liquid absorbent wherein separate streams of liquid refrigerant are formed by condensing separate streams of refrigerant vapor in a plurality of condenser units and the separate streams of liquid are flowed to an evaporator system, generator structure to supply separate streams of refrigerant vapor, said generator structure having two generator chambers, conduits to conduct separate streams of refrigerant vapor from said two generator chambers to said condenser units, conduits to conduct separate streams of liquid refrigerant from said condenser units to said evaporator system, a flue in heat conducting relationship to the chambers of the generator structure, a single heating element at one end of the flue, and a device within said flue and adapted to vary the relative heating of the bodies of liquid in the two generator chambers.

16. A method of refrigerating which includes evaporating liquid refrigerant to produce cold, absorbing the resulting refrigerant vapor into a liquid absorbent, conducting the resulting solution to the first stage of a series of stages in each of which heat is applied to the solution to expel refrigerant vapor therefrom, withdrawing vapor from said first stage and liquefying the withdrawn vapor to provide liquid refrigerant for said evaporating step, withdrawing vapor from a subsequent stage and flowing the withdrawn vapor in heat exchange relation with solution being conducted to said first stage, and after said heat exchange liquefying the vapor involved therein to also provide liquid refrigerant for said evaporating step.

17. In the art of providing a plurality of streams of liquid refrigerant in an absorption refrigeration system, the steps of passing a stream of liquid absorbent rich in refrigerant to a place to be heated, applying the heat from a single heating element to heat the liquid at such place to expel a first stream of refrigerant vapor, transferring the liquid from the first place to a second place of heating, applying the heat from said single heating element to heat the liquid at said second place of heating to produce a second stream of refrigerant vapor, rectifying said second stream of refrigerant vapor to produce a second stream of substantially pure refrigerant vapor, and condensing said first and second streams of refrigerant vapor separately to produce separate streams of liquid refrigerant.

18. A method of absorption refrigeration which includes passing a stream of liquid absorbent containing refrigerant through a place of heating which includes a generator having two separate sections, applying the heat from a single heating element to heat the two sections of said generator, withdrawing separate streams of refrigerant vapor from said two sections and condensing the two streams of vapor separately to provide two streams of liquid refrigerant, and regulating the relative heating effect produced in the two sections of the generator by the single heating element to control the relative amounts of liquid refrigerant supplied in the two streams of liquid refrigerant.

WALTER W. SOROKA.

CERTIFICATE OF CORRECTION.

Patent No. 2,357,612.                                September 5, 1944.

WALTER W. SOROKA.

It is hereby certified that error appears in the printed specification of the above numbered patent requiring correction as follows: Page 3, first column, lines 52, 53 and 54, claim 7, strike out the words "distribution of the heat from the said generator, and means to control" and insert instead --said generator, and means to control the distribution of the heat from--; and that the said Letters Patent should be read with this correction therein that the same may conform to the record of the case in the Patent Office.

Signed and sealed this 21st day of November, A. D. 1944.

Leslie Frazer (Seal)                              Acting Commissioner of Patents.